United States Patent Office 2,766,302
Patented Oct. 9, 1956

2,766,302

ISOMERIZATION OF ALKANES AND CYCLOALKANES

Robert H. Elkins, Chicago, Ill., assignor to Sinclair Refining Company, New York, N. Y., a corporation of Maine No Drawing. Application January 17, 1952,
Serial No. 266,993

7 Claims. (Cl. 260—666)

My invention relates to the isomerization of alkanes and cyclo alkanes to introduce branching into the structure, e. g. isomerization of cyclohexane to methyl cyclopentane. Until the development of catalysts comprising platinum on acidic type base, the only efficient catalysts for the isomerization of alkanes and cyclo alkanes were aluminum chloride, hydrogen fluoride and boron trifluoride complexes and other acidic materials. Operation with these catalysts however must be restricted to temperatures below 300° F., because of their volatility and corrosiveness as well as their high activity for cracking and tar formation. This is disadvantageous from the standpoint of efficient isomerization since temperature plays an important role in the isomerization reaction due to thermodynamic considerations. For example, the equilibrium conversion of cyclohexane to methyl cyclopentane is 10 percent at room temperature, 50 percent at 250° F. and becomes well over 85 percent at temperatures above 600° F. Obviously, therefore, operation at elevated temperature is highly desirable for high conversion for this type operation.

The platinum-acid base catalysts, e. g. platinum on fluoride promoted alumina, are efficient isomerization catalysts in the temperature range of about 650° to 1000° F. The platinum-acid base catalysts, however, dehydrogenate alkanes and cyclo alkanes at elevated temperature. For example, with cyclohexane there is a shift in the equilibrium resulting in a net conversion of methyl cyclopentane to benzene. Also under elevated temperature conditions for isomerization hydrocracking occurs which further reduces yield.

I have discovered that the presence of sulfur or a sulfur containing material in small amount in the reaction zone during alkane and cyclo alkane isomerization effectively suppresses dehydrogenation and hydrocracking. My invention, therefore, comprises the method of contacting the feed stock of alkanes and cyclo alkanes at an elevated temperature of about 650° to 1000° F. with a platinum-acidic base catalyst in the presence of a small amount of sulfur. The reaction conditions further include a pressure of about 200 to 1000 p. s. i. g. and a hydrogen to hydrocarbon ratio in the range of 1–20:1. The liquid hourly space velocity is in the range of about 0.5 to 8. The amount of sulfur which advantageously is in the form of hydrogen sulfide or a mercaptan added to the feed is of the order of less than 1 percent by weight of the feed.

The effectiveness of sulfur in suppressing dehydrogenation and hydrocracking in the isomerization of an alkane or cyclo alkane is illustrated in the following results with cyclohexane. A cross cut refinery $C_6$ fraction was employed as feed with 2.4 mole percent of sulfur, which corresponds to 0.76 weight percent, added in the form of tertiarybutyl mercaptan. The feed stock was processed over a catalyst comprising 0.3 percent platinum, 0.75 percent fluorine on an alumina gel base at a temperature of 905° F. The product naphthenes comprised 87 percent methyl cyclopentane and 13 percent cyclohexane.

The equilibrium mixture at 905° F. is 92 percent methyl cyclopentane so that it is apparent that equilibrium was approached. Only 4.8 percent of the naphthenes present were cracked to aliphatics and only 11.5 percent were dehydrogenated to benzene. The detailed results are shown in the following table:

TABLE

| Feed Stock | $C_6$ Blend | $C_6$ Blend | $C_6$ Blend |
|---|---|---|---|
| Percent t-butyl mercaptan, Mole percent | 0 | 0 | 2.4 |
| L. H. S. V | | 4.0 | 4.1 |
| $H_2$/Hydrocarbon Ratio | | 5.2 | 4.9 |
| Temperature, °F | | 905 | 905 |
| Pressure | | 750 | 750 |
| Products: | | | |
| Aliphatics | 47.5 | 53.5 | 47.6 |
| M. C. P | 29.2 | 26.7 | 38.2 |
| Cyclohexane | 21.1 | 2.9 | 5.7 |
| Benzene | 2.1 | 16.5 | 6.0 |
| | | 99.6 | 97.5 |
| Percent Naphthenes Cracked | | 6.3 | 2.5 |

It is apparent from the above data that the sulfur has acted to suppress dehydrogenation activity to the extent that it interferes substantially with isomerization and substantially suppresses hydrocracking. The method is applicable to other isomerization reactions such as isomerization of normal alkanes, e. g. pentane or octane to branch chain hydrocarbons. Although it is preferable to effect the sulfur treatment by addition of a vaporizable compound of sulfur such as a mercaptan or hydrogen sulfide to the feed so as to obtain a continuous treatment, the catalyst may be pretreated with a sulfur compound before use to obtain the desired properties. Thus in the preparation of a typical catalyst, fluoride is incorporated in an alumina hydrogel by aqueous ammonium fluoride solution, platinum is added in the form of a platinum sulfide sol or in the form of chloroplatinic acid and the mixed hydrogel is dried, reduced in the presence of hydrogen and calcined at 900° to 1100° F. The catalyst may be formed as pellets or may be extruded or may be produced in the form of granules depending upon the mode of catalyst handling during the processing operation contemplated. The catalyst may be treated with hydrogen sulfide or other sulfides to produce a catalyst containing residual sulfide.

Platinum catalysts in various forms may be employed. For example, a platinum catalyst of the type described in U. S. Patent 2,550,531 which employs an alumina base including silica as the acidic promoter is employed. The cracking activity of the base is reduced by sintering the base to reduce its surface area to below about 65 square meters per gram.

I claim:

1. In the isomerization of alkanes and cyclo alkanes to introduce branching into their structure the method of contacting the feed stock with a platinum-acidic base catalyst in the presence of a small amount of chemically combined sulfur of the order of about 0.7 to less than about 1 percent by weight of the feed and sufficient substantially to suppress aromatics forming and hydrocracking reactions at an elevated temperature of about 650° to 1000° F., a pressure of about 200 to 1000 p. s. i. g. and a hydrogen to hydrocarbon ratio of about 1–20:1.

2. The method of claim 1 in which the sulfur is in the form of a vaporizable sulfur compound added to the feed.

3. In the isomerization of $C_6$ alkanes and $C_6$ cyclo alkanes to introduce branching into their structure the method of contacting the feed stock with a platinum-acidic base catalyst in the presence of a small amount of chemically combined sulfur of the order of about 0.7 to less than about 1 percent by weight of the feed and sufficient substantially to suppress aromatics forming and hydrocracking reactions at an elevated temperature of about 650° to 1000° F., a pressure of about 200 to 1000 p. s. i. g., a hydrogen to hydrocarbon ratio of about 1–20:1 and recovering methyl cyclopentane from the reaction mixture.

4. The method of claim 3 in which the sulfur is in the form of a vaporizable sulfur compound added to the feed.

5. The method of claim 4 in which the sulfur compound is a mercaptan.

6. In the isomerization of a hydrocarbon feed stock consisting essentially of $C_6$ alkanes and $C_6$ cycloalkanes, the method which comprises admixing tertiarybutyl mercaptan with the feed stock and then contacting the feed stock with a platinum-acidic base catalyst at elevated temperatures of about 650° to 1000° F., a pressure of about 200 to 1000 p. s. i. g. and a hydrogen to hydrocarbon ratio of about 1–20:1, the amount of tertiarybutyl mercaptan admixed with the feed stock being sufficient to provide an amount of sulfur of the order of about 0.7 to less than about 1 percent by weight of the feed and sufficient substantially to suppress aromatics forming and hydrocracking reactions.

7. In the isomerization of a hydrocarbon feed stock consisting essentially of $C_6$ alkanes and $C_6$ cycloalkanes, the method which comprises admixing a vaporizable mercaptan with the feed stock and then contacting the feed stock with a platinum-acidic base catalyst at an elevated temperature of about 650° to 1000° F., a pressure of about 200 to 1000 p. s. i. g. and a hydrogen to hydrocarbon ratio of about 1–20:1, the amount of vaporizable mercaptan admixed with the feed stock being sufficient to provide an amount of sulfur of the order of about 0.7 to less than about 1 percent by weight of the feed and sufficient substantially to suppress aromatics forming and hydrocracking reactions.

References Cited in the file of this patent

UNITED STATES PATENTS

| | | |
|---|---|---|
| 2,168,840 | Groll | Aug. 8, 1939 |
| 2,550,531 | Ciapetta | Apr. 24, 1951 |
| 2,566,521 | Haensel | Sept. 4, 1951 |
| 2,573,149 | Kassel | Oct. 30, 1951 |
| 2,582,428 | Haensel | Jan. 15, 1952 |

OTHER REFERENCES

Kastens et al.: "Ind. and Eng. Chem.," vol. 42 (1950), pages 582–593.